United States Patent [19]

Lehmann

[11] Patent Number: 5,453,037

[45] Date of Patent: Sep. 26, 1995

[54] PROCESS FOR GRINDING CRANKPINS OF A CRANKSHAFT AND GRINDER FOR THIS PURPOSE

[75] Inventor: Dieter Lehmann, Dreieich, Germany

[73] Assignee: Naxos-Union Schleifmittel- und Schleifmaschinenfabrik AG, Frankfurt am Main, Germany

[21] Appl. No.: 9,637

[22] Filed: Jan. 27, 1993

[30] Foreign Application Priority Data

Jan. 30, 1992 [DE] Germany .................... 42 02 513.3

[51] Int. Cl.6 .................................................. B24B 49/00
[52] U.S. Cl. .................... 451/5; 451/8; 451/9; 451/62; 451/242; 451/251
[58] Field of Search ............................ 451/1, 5, 8, 9, 451/10, 28, 62, 49, 177, 242, 246, 249, 251, 307, 308, 331, 346, 365, 397, 402, 403

[56] References Cited

U.S. PATENT DOCUMENTS

| | | |
|---|---|---|
| 1,925,911 | 9/1933 | Steiner. |
| 3,142,941 | 8/1964 | Fournier et al. .................. 51/105 SP |
| 3,584,423 | 6/1971 | Hoare ............................. 51/105 SP |
| 3,780,474 | 12/1973 | Ota ................................. 51/105 SP |
| 3,793,687 | 2/1974 | Berbalk. |
| 4,305,232 | 12/1981 | Price ............................... 51/105 SP |
| 4,305,689 | 12/1981 | Yamade et al. .................. 51/105 SP |
| 5,144,772 | 9/1992 | Kawamata et al. .............. 51/105 SP |

FOREIGN PATENT DOCUMENTS

| | | |
|---|---|---|
| 1205416 | 11/1965 | Germany. |
| 2208593 | 5/1973 | Germany. |
| 3121609 | 12/1982 | Germany. |
| 2072063 | 9/1981 | United Kingdom. |

Primary Examiner—Maurina T. Rachuba
Attorney, Agent, or Firm—Wenderoth, Lind & Ponack

[57] ABSTRACT

A process for successive grinding of crankpins of crankshaft by a grinder includes clamping the crankshaft at two spaced center journals thereof and rotating the crankshaft around the axis of a crankpin to be ground. To enable the maintenance of highly acurate production tolerances even for small quantities and large crankshafts in an economical manner, only crankpins directly adjacent to the center journals that are clamped are ground. Different clamping positions of the crankshaft are offset axially from one another by the center-to-center distance between two adjacent crankpins of the center journals or a multiple thereof.

29 Claims, 3 Drawing Sheets

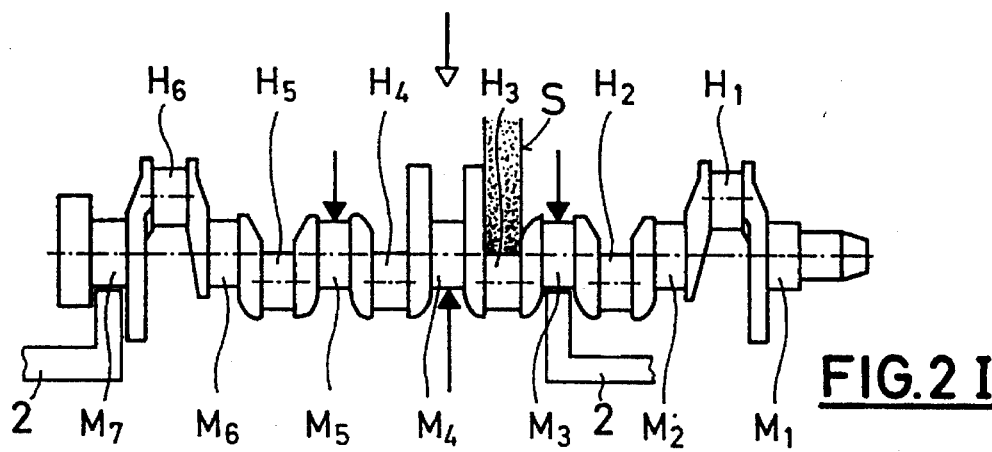
FIG.2 I
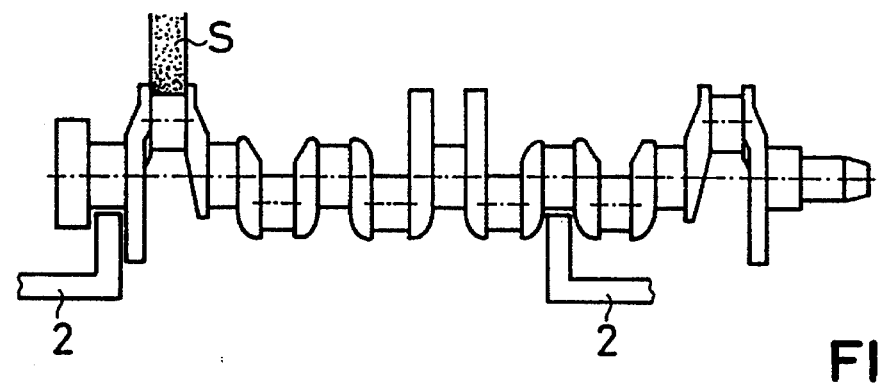
FIG.2 II
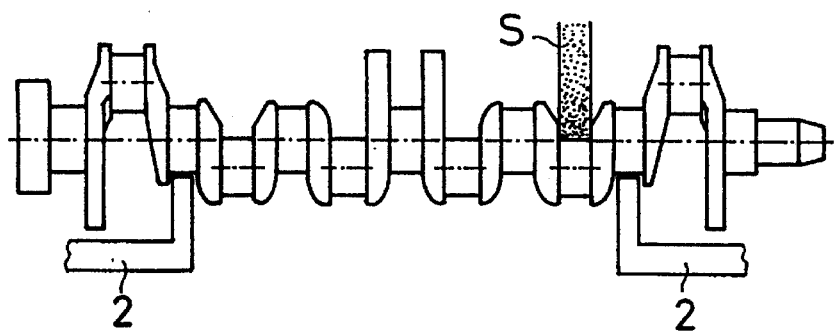
FIG.2 III

PROCESS FOR GRINDING CRANKPINS OF A CRANKSHAFT AND GRINDER FOR THIS PURPOSE

BACKGROUND OF THE INVENTION

The invention relates to a process for successive grinding of crankpins of a crankshaft by means of a grinding attachment, for example a rotating wheel, in which process the crankshaft is clamped at two spaced center journals and is rotated around the axis of the crankpin to be ground, and to a grinder especially for implementing such process.

In a known process for grinding crankpins, the two outermost center or main bearing journals of the crankshaft are clamped eccentrically in chucks of work headstocks and the crankpins are ground in succession by a grinding wheel. In such grinding operations, the bending behavior of the crankshaft clamped only at its two ends is problematic when the crankshaft exceeds a specific length and/or a specific weight. The consequence of deflection of the crankshaft resulting from its own weight is an elastic deformation in the region of the crankpins to be ground, such deflection not allowing required tolerances for concentricity and width to be maintained. Also, the piston stroke length required for optimal combustion in the cylinder cannot be reached in these cases with crankpins that are ground inaccurately. To reduce dimensional deviations as a consequence of deflection, the crankpin to be ground is braced in the known method while grinding by means of a separate steady rest, which absorbs a part of the weight of the workpiece. Such steady rests are, however, time-consuming to mount and can compensate only partially for the deflection of the shaft. In particular, during mass production, grinding the crankpins of the crankshafts is done in succession on several different grinders, whereby only the crankpin immediately adjacent internally to the center journal intended for clamping is ground. Grinding is done simultaneously with two wheels beginning with the two outermost crankpins directly next to the clamping points. The next two crankpins that follow inwardly have to be ground on another machine, whereby the crankshaft is clamped on the center journals directly adjacent outwardly to the crankpins to be ground, etc. A work headstock is not necessary, since the chucks acting directly next to the crankpin to be ground guarantees adequate bracing. In such a process, three double wheel grinders alone are necessary, for example, for the production of a six-throw crankshaft. This can be justified for mass production operations, but for operations involving smaller quantities it is not profitable.

SUMMARY OF THE INVENTION

Therefore, the object of the invention is to improve a process of this type in such a manner that adequately small production tolerances with low cost in machinery can be obtained.

This problem is solved in essence with the invention in that only the crankpins directly adjacent to center journals being clamped are ground, in different clamping positions of the crankshaft that are offset axially from one another by the center-to-center distance between two adjacent crankpins or the center journals or a multiple thereof. At the same time, faultless bracing of the crankshaft is guaranteed by clamping effected directly next to the crankpin to be ground, so that deflection of the crankpin to be ground is within an acceptable range of tolerances. Additional support measures such as work headstocks are not necessary. All crankpins of a crankshaft are ground on one and the same grinder, and in particular with high accuracy, even in the case of large crankshafts such as those for trucks. Above all, the especially important vertical lift tolerance is definitely improved due to a very rigid workpiece guide and constant grinding conditions at all crankpins. Other advances are obtained for concentricity and cylindricity. In total, the position of the crankpins, which is so important for operation of a motor, with respect to adjacent center journals is better controlled with the process according to the invention as compared to conventional grinding practices.

To keep the number of clamping positions of the crankshaft and thus the production time as small as possible, one embodiment of the invention provides that two crankpins at a time are ground in one clamping position of the crankshaft.

Preferably the crankshaft is reset from one (first) clamping position axially merely by the center-to-center distance between two adjacent crankpins or center journals into an(other) clamping position. Thus the distance & movement between the clamping positions is kept as small as possible, a feature that leads to another reduction in production times.

To obtain an axially accurate alignment between grinding wheel and crankshaft, the crankshaft is adjusted axially relative to the grinding wheel and radially relative to the respective axis of rotation, expediently following coarse positioning by putting the crankshaft into the (first) clamping position or resetting the crankshaft into an(other) clamping position.

Preferably, the axial clamping position of the crankshaft is scanned at shoulders of the respective crankpin to be ground.

To ensure that the crankpin to be ground is situated in the center of rotation of the grinder, following insertion into the (first) clamping position, the crankshaft is conveyed (indexed) according to the invention into the correct position of rotation with respect to the first crankpin to be ground and prior to grinding the other crankpin is conveyed (indexed) into the correct position of rotation through comparison with the crankpin ground first. Cummulative indexing errors are avoided by such reference to the first crankpin to be ground.

To reach the requisite accuracy in the minimum production time, another embodiment of the invention provides that first the grinding wheel is moved rapidly into an initial position up to the crankshaft, then the rate of infeed from first grinding the crankpin step by step up to the final diameter of the crankpin is reduced, and finally the grinding wheel is returned in rapid traverse into the starting position.

At the same time it has proven to be expedient if the crankshaft is rotated at different speeds in adaptation to the rate of infeed of the grinding wheel.

To safely transport the crankshaft, it is clamped, according to the invention, on three center journals for the purpose of insertion and axial resetting from one clamping position to the next.

So that there can be no losses in quality due to wear of the grinding wheel, the grinding wheel is dressed periodically, preferably during the grinding process, in order to reproduce the specified geometry of the grinding wheel profile.

The invention also relates to a grinder, in particular to implement the aforementioned process, with two chucks, which can be rotated at a distance from two center journals to be clamped, around the respective axis of the crankpin to be ground, and a grinding attachment, in particular a wheel, which is pivotally mounted and can be fed to the crankpins to be ground. The chucks are mounted at a fixed or permanently adjustable distance from each other on a workpiece table, which in any clamping position of the crankshaft can be moved axially to the wheel into a position in which the wheel can be assigned to a crankpin that is directly adjacent to the center journal to be clamped.

To enable a defined resetting of the crankshaft, the center-to-center distance between the chucks corresponds to 1– to (n–1) times the distance between two adjacent crankpins or center journals in the case of a wheel to grind a crankshaft with n crankpins and n+1 center journals.

To facilitate the maintenance of grinder or to automate extensively the grinder, in another embodiment of the invention there is a mechanism for axially shifting the crankshaft from a (first) clamping position by at least the center-to-center distance between two adjacent crankpins or center journals into an(other) clamping position of the crankshaft.

To guarantee the safe transport of the crankshaft, the resetting mechanism of the invention clamps the crankshaft at three center journals.

Equipment cost is further reduced according to the invention by a fact that the resetting mechanism also serves to lay the crankshaft into the first clamping position and to lift the crankshaft out of a last clamping position.

An exact axial alignment of the crankshaft and grinding wheel is achieved with one feature of the invention in that the axial clamping position of the crankshaft is roughly defined by the chucks and the center journals and can be adjusted by means of the axial positioning device.

The axial positioning device scans the axial clamping position of the crankshaft at the shoulders of the crankpin to be ground and positions the crankshaft by traversing the workpiece table axially.

In a preferred embodiment of the invention the crankshaft can be laid into the first clamping position by means of the resetting mechanism into a defined position of rotation with respect to the first crankpin to be ground.

Expediently the radial clamping position of the crankshaft can be monitored and adjusted by means of a controller.

In a conventional grinder, the crankpins to be ground are conveyed into the correct position of rotation by way of a coaxial indexing device that positions the crankshaft by turning the chucks or in the chucks. In the grinder according to the invention, such a coaxial indexing device is no longer expedient due to the axially shifted clamping positions. In another preferred embodiment of the invention, therefore, the grinder includes an indexing mechanism that makes contact at the crankpin to be ground and rotates the crankshaft with respect to the crankpin to be ground a grind position.

To avoid cummulative indexing errors, it is provided according to the invention that the crankpin ground first serves as a reference for adjusting the grinding position of a crankpin to be ground next.

Rapid, but nevertheless accurate machining of the crankshaft is made possible with the invention in that the grinder includes a device to radially feed the grinding wheel at different rates into the clamped crankshaft. In this manner rough machining is possible with a relatively large infeed, while the final diameter can be approached slowly and with high accuracy.

Expediently, the crankshaft can be driven at different speeds, so that it can be adapted to the optionally different rates of infeed of the grinding wheel.

To avoid loss in quality due to wear of the grinding wheel, a device to dress the grinding wheel is provided according to the invention.

In order not to have to interrupt the grinding process and to be able to define accurately the end of grinding, the grinder preferably includes a device for measuring the diameter of a crankpin during the grinding operation.

To maintain as free as possible the work space of the grinder for inserting, resetting and removing the crankshaft, the diameter measuring device, the axial positioning device, and/or the indexing device can be expediently conveyed by means of a swivel carriage out of a waiting position into a working position at the crankshaft.

The tool table is reliably prevented from shifting with respect to the grinding wheel in that the tool table can be clamped, preferably hydraulically, into position during the grinding operation.

In one embodiment of the invention the chucks can be fixed into position during the insertion, resetting and/or indexing of the crankshaft.

To enable an unimpeded rotation of the crankshaft for the purpose of indexing, the clamping of the crankshaft can be unclamped, according to the invention, during the indexing operation.

Accurate operation of the grinder, that requires few operators but is nevertheless reliable, is achieved preferably through numerical control (CNC), which ensures that individual members of the grinder function in the correct order and in the correct time lapse.

BRIEF DESCRIPTION OF THE DRAWINGS

Other features, advantages and possible applications of the invention follow from the following description of an embodiment and drawings. At the same time all described and/or illustrated features form by themselves or in any arbitrary combination the subject matter of the invention, independently of their summary in the claims or their references.

DETAILED DESCRIPTION OF THE INVENTION

Figure 1:
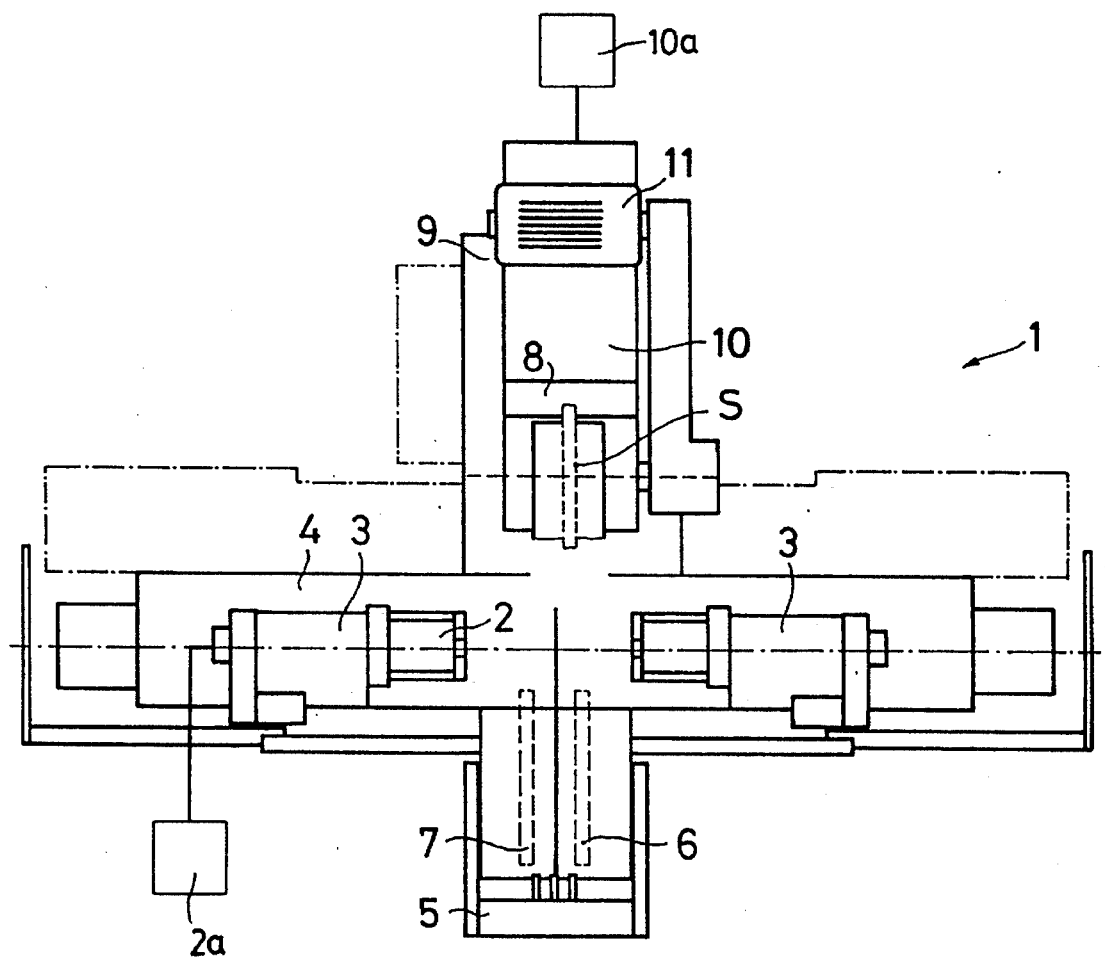
FIG. 1 is a diagrammatic view of a grinder according to the invention.

As shown in the drawings, a grinder 1 for grinding crankpins $H_1 \ldots H_n$ of a crankshaft K includes two chucks 2, swivel-mounted drivably at work headstocks 3, in order to receive the crankshaft K. The work headstocks 3 are mounted on a tool table 4, which can be traversed in the axial direction, but is clamped hydraulically into position during the grinding operation. The crankshaft K is laid into the chuck 2 by means of a pivotable resetting or loading device 5, can be reset into different clamping positions that are axially offset from one another, and can be lifted out of the chucks 2.

Following coarse positioning that is defined by chucks 2 and already existing center main bearing journals $M_1 \ldots M_{n+1}$ when inserting or resetting the crankshaft K by means of the resetting device 5, the crankshaft K is finely adjusted with respect to a rotatably mounted grinding wheel S, that is movable radially toward crankshaft K, by way of an axial positioning mechanism 6 with an integrated diameter measuring device for automatically acquiring the diameter of the crankpin $H_1 \ldots H_n$ during the grinding operation. A crankpin $H_1 \ldots H_n$ to be ground is conveyed into the correct position of rotation for grinding the crankshaft K relative to its clamping by way of an indexing mechanism 7, which takes hold of the crankpin $H_1 \ldots H_n$ to be ground radially from the outside and conveys it into the center of rotation of the chucks 2. In so doing, a previous crankpin $H_1 \ldots H_n$ that is already ground is used as a reference.

The profile of the wheel S is machined periodically with an automatic dresser 8 during the grinding operation and the specified geometry is reproduced. The wheel S and the dressing device 8 at a grinding spindle head 10 are mounted on a rear machine bed 9 and are driven by a wheel spindle drive 11.

Figure 2:
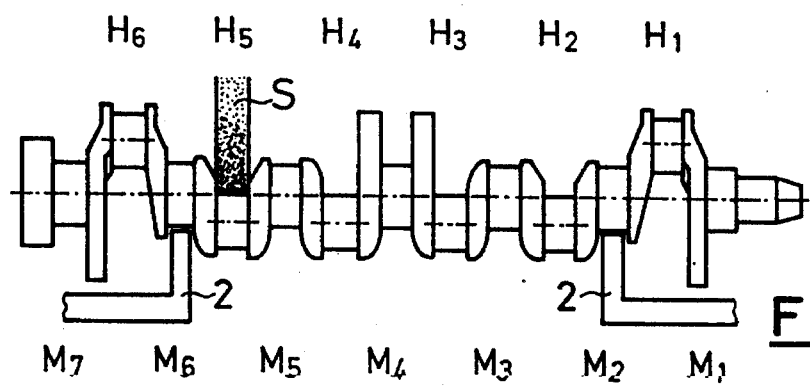
FIGS. 2I to VI are diagrammatic views of process steps of a process according to the invention.
Figure 2:
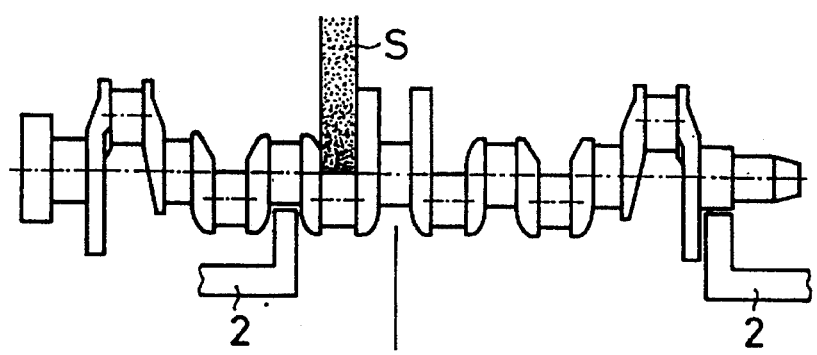
Figure 2:
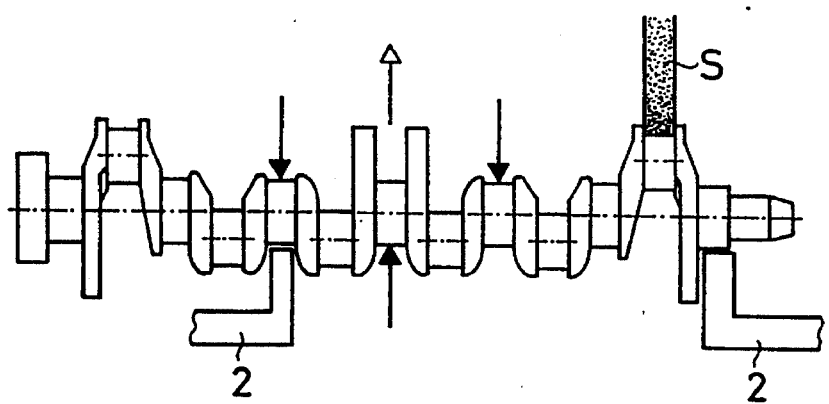

With the aid of FIGS. 2 I–VI, the process of the invention is now described using the example of a six-throw crankshaft K. The crankshaft K is clamped by the resetting device 5 at the three center journals $M_3$, $M_4$, $M_5$ and inserted into the chucks 2 of the work headstocks 3. At the same time it is ensured that, following loading, the crankshaft K is radially in a defined position relative to the indexing device 7. The correct radial position is monitored by a light barrier, which gives an error message when the crankshaft K is in a wrong position. The rough position during the insertion of the crankshaft K is determined radially by the resetting device 5 and axially by the width of the chucks 2 and the center journals $M_1 \ldots M_{n+1}$. The chucks 2 are fixed into position during the insertion, resetting and indexing operations. To this end, hydraulically driven pins lock into notches of faceplates and prevent the chucks 2 from rotating. In this manner the transfer of the indexing angle is ensured during the indexing operation.

To grind the six-throw crankshaft K, it is laid, first of all, into the chucks 2 in such a manner that the one outermost center journal $M_7$ and one inner center journal $M_3$ can be clamped into the chucks 2, so that the four crankpins $H_3 \ldots H_6$ lie between the clamping points. First, only the crankpins $H_3$ and $H_6$ that lie directly adjacent next to the center journals $M_3$ and $M_7$ intended for clamping are ground (FIGS. 2 I and 2 II). The crankpins $H_2$ and $H_5$ (FIGS. 2 III and FIGS. 2 IV) and $H_4$ and $H_1$ (FIGS. 2 V and 2 VI) can be ground by resetting the crankshaft K twice axially by a center-to-center distance between the crankpins $H_1 \ldots H_n$ or the center journals $M_1 \ldots M_{n+1}$.

After the crankshaft K has been put in the first clamping position (FIGS. 2 I and 2 II) into the chucks 2 (of which in the diagrammatic views of FIG. 2 only bottom clamping shells are shown, the crankpin $H_3$ is indexed. In so doing, the tool table 4 travels with respect to the crankpin $H_3$ in indexing position and the indexing device 7 lying parallel to the axis of rotation makes contact radially from the outside with the crankpin $H_3$ to be ground by swivelling into the working region and rotates such crankpin into the center of rotation of the chucks 2. After the workpiece table 4 has travelled relative to the crankpin $H_3$ into the grinding position, grinding takes place (FIG. 2 I), whereby the grinding spindle head 10 moves the rotatingly driven wheel S from a starting position first in rapid movement up to a first preliminary position to the crankshaft K. Then the rate of infeed of the wheel S is reduced. The crankpin $H_3$ is initially ground while rotating the crankshaft K by means of the driven chucks 2. A feeler of the diameter measuring device is applied to the crankshaft $H_3$ to be ground. The diameter is measured during the grinding operation, so that continuous monitoring and control thereof is possible. The crankpin $H_3$ is rough ground up to final dimensions. Then the rate of infeed of the wheel S is reduced in several steps, e.g., by control device 10a, until the final diameter is reached. At the same time the crankshaft speed is adapted to, the rate of infeed e.g., by rotation control 2a. After reaching the final diameter, the grinding spindle head 10 with the wheel S returns in rapid movement to the starting position and the diameter measuring device swings from the ground crankpin $H_3$ to the outside.

At this stage, the other crankpin $H_6$, adjacent to the other clamping point of the first clamping position of the crankshaft K, is machined. To this end, the workpiece table 4 with the crankshaft K is driven into indexing position. The crankshaft K, as described above, is indexed at the crankpin $H_3$ to be ground, and the workpiece table 4 with the crankpin $H_6$ to be ground is finally moved into grinding position. Then the crankpin $H_6$ is also ground in the manner described above (FIG. 2 II).

Then the crankshaft K is lifted out of the chucks 2 by means of the resetting device 5, the workpiece table 4 travels by a center-to-center distance between two adjacent crankpins $H_1 \ldots H_n$ or center journals $M_1 \ldots M_{n+1}$ axially relative to the crankshaft K to the right, and the crankshaft K is deposited again by the resetting device 5 into chucks 2 at the now second axial clamping position. Again, indexing takes place in the manner described above at the crankpin $H_2$ (FIG. 2,); and the crankpins $H_2$ and $H_5$ are ground.

Following another resetting of the crankshaft K by a center-to-center distance between two adjacent crankpins $H_1 \ldots H_n$ relative to the chucks 2 by moving the workpiece table 4 relative to the crankshaft K to the right, the crankpins $H_4$ (FIG. 2 V) and $H_1$ (FIG. 2 VI) are indexed and ground in the same manner.

After the last crankpin $H_1 \ldots H_n$ has been machined, the workpiece table 4 is moved into an unloading position. The finished crankshaft K is removed with the resetting device 5 from the work space, and the grinder 1 is ready to be loaded again with a new crankshaft K to be ground.

In the same manner, crankshafts K with smaller or larger numbers of crankpins $H_1 \ldots H_n$ can be ground in the order of the invention and with the grinder according to the invention.

I claim:

1. In a process for successive grinding of crankpins of a crankshaft having a plurality of spaced crankpins and main bearing journals, wherein said crankshaft is clamped and rotated about an axis of each crankpin during grinding thereof by a grinder, the improvement comprising:

sequentially locating said crankshaft in plural clamping positions that are offset relative to each other axially of said crankshaft by a distance equal to a center-to-center spacing between two adjacent said crankpins or said journals or a multiple of said spacing;

at each said clamping position, clamping said crankshaft at two said journals thereof, the two journals being clamped at any said clamping position being different than the two journals that are clamped in any other said clamping position; and at each said clamping position, rotating said crankshaft only about the axis of at least one selected said crankpin that is immediately adjacent at least one of said journals that is clamped at the respective said clamping position, and grinding said at least one selected crankpin by said grinder.

2. The improvement claimed in claim 1, comprising, at each said clamping position, grinding two selected said crankpins, each located immediately adjacent a respective said journal that is clamped.

3. The improvement claimed in claim 2, comprising, after location of said crankshaft at each said clamping position, indexing said crankshaft to a correct position of rotation with respect to said axis of a first said selected crankpin, and after grinding of said first selected crankpin indexing said crankshaft to a correct position of rotation with respect to said axis of a second said selected crankpin.

4. The improvement claimed in claim 3, wherein said indexing with respect to said axis of said second selected crankpin is with reference to the previously ground first selected crankpin.

5. The improvement claimed in claim 2, wherein said two selected crankpins are located between the two said journals being clamped.

6. The improvement claimed in claim 1, wherein, at each said clamping position, said at least one selected crankpin is located between the two said journals being clamped.

7. The improvement claimed in claim 1, wherein, at each said clamping position, at least one of the two said journals being clamped is not an endmost journal of said crankshaft.

8. The improvement claimed in claim 1, comprising, after location of said crankshaft roughly at each said clamping position, indexing said crankshaft radially relative to said axis of said at least one selected crankshaft to determine the final said clamping position.

9. The improvement claimed in claim 1, comprising, after location of said crankshaft roughly at each said clamping position, indexing said crankshaft axially relative to a position of said grinder to determine the final said clamping position.

10. The improvement claimed in claim 6, wherein said indexing is controlled relative to shoulders of said at least one selected crankpin.

11. The improvement claimed in claim 1, wherein said locating comprises, for each said clamping position, grasping said crankshaft by a resetting mechanism and moving said crankshaft axially to said each clamping position.

12. The improvement claimed in claim 11, wherein said resetting mechanism grasps said crankshaft at three said journals thereof.

13. The improvement claimed in claim 1, further comprising, for each operation of grinding of a said selected crankpin by said grinder, first rapidly moving said grinder from a starting position thereof to an initial position at said selected crankpin, then reducing step-by-step the speed of movement of said grinder toward said selected crankpin during grinding thereof to a final diameter thereof, and then rapidly moving said grinder away from said crankshaft to said starting position.

14. The improvement claimed in claim 13, further comprising varying the rate of rotation of said crankshaft as a function of different speeds of movement of said grinder toward said crankshaft.

15. The improvement claimed in claim 1, wherein said grinder is a grinding wheel, and further comprising periodically dressing said grinding wheel during grinding operations thereby.

16. A grinding apparatus for successive grinding of crankpins of a crankshaft having a plurality of spaced crankpins and main bearing journals, said apparatus comprising:

two chucks mounted at a distance from each other to enable said chucks to clamp the crankshaft at two of the journals thereof and to rotate the thus clamped crankshaft about the axis of at least one selected crankpin that is immediately adjacent at least one of the journals that is clamped;

a device to sequentially locate the crankshaft in plural clamping positions that are offset relative to each other axially of the crankshaft by a distance equal to a center-to-center spacing between two adjacent crankpins or journals or a multiple of said spacing, such that the two journals clamped by said chucks at any said clamping position are different than the two journals that are clamped by said chucks in any other said clamping position; and a grinder movable to grind the at least one selected crankpin.

17. An apparatus as claimed in claim 16, wherein said two chucks are mounted on a workpiece table that is movable axially in any of said clamping positions to move the crankshaft to a position such that the at least one selected crankpin is aligned with said grinder.

18. An apparatus as claimed in claim 17, for a crankshaft having n crankpins and n+1 journals, wherein said distance between said two chucks is equal to 1 to (n−1) times the spacing between two adjacent crankpins or journals.

19. An apparatus as claimed in claim 16, wherein said distance between said two chucks is such that, at each said clamping position, at least one of the two journals being clamped is not an endmost journal of the crankshaft.

20. An apparatus as claimed in claim 16, wherein said device comprises a resetting mechanism to grasp the crankshaft and to move the crankshaft axially to each said clamping position.

21. An apparatus as claimed in claim 20, wherein said resetting mechanism grasps the crankshaft at three journals thereof.

22. An apparatus as claimed in claim 16, further comprising an axial positioning device to, after location of the crankshaft roughly at each said clamping position, index the crankshaft axially to the final said clamping position.

23. An apparatus as claimed in claim 22, wherein said axial indexing is controlled relative to shoulders of the at least one selected crankpin.

24. An apparatus as claimed in claim 16, further comprising a radial indexing device to, after location of the crankshaft roughly at each said clamping position, index the crankshaft radially relative to the axis of the at least one selected crankpin to the final said clamping position.

25. An apparatus as claimed in claim 24, wherein said radial indexing device is operable to make contact with the at least one selected crankpin.

26. An apparatus as claimed in claim 16, wherein said grinder is mounted for movement toward and away from the crankshaft.

27. An apparatus as claimed in claim 26, wherein the speed of movement of said grinder is variable.

28. An apparatus as claimed in claim 27, wherein the rate of rotation of the crankshaft by said two chucks is variable as a function of different speeds of movement of said grinder toward the crankshaft.

29. An apparatus as claimed in claim 16, wherein said grinder comprises a grinding wheel, and further comprising a device to periodically dress said grinding wheel during grinding operations thereby.

* * * * *